US008238336B2

(12) United States Patent
Jiang

(10) Patent No.: US 8,238,336 B2
(45) Date of Patent: Aug. 7, 2012

(54) METHOD FOR FORWARDING DATA PACKET, SYSTEM, AND DEVICE

(75) Inventor: Sheng Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/247,619

(22) Filed: Sep. 28, 2011

(65) Prior Publication Data

US 2012/0020359 A1   Jan. 26, 2012

Related U.S. Application Data

(63) Continuation of application No. 13/111,662, filed on May 19, 2011, which is a continuation of application No. PCT/CN2009/072671, filed on Jul. 7, 2009.

(30) Foreign Application Priority Data

Nov. 20, 2008   (CN) .......................... 2008 1 0219260

(51) Int. Cl.
*H04L 12/56* (2006.01)
*H04L 1/16* (2006.01)

(52) U.S. Cl. ........ 370/389; 370/252; 370/254; 370/401; 370/466

(58) Field of Classification Search .................. 370/252, 370/254, 389, 401, 466
See application file for complete search history.

(56) References Cited

U.S. PATENT DOCUMENTS

| 7,391,768 B1 | 6/2008 | Samprathi et al. |
| 7,526,562 B1 * | 4/2009 | Samprathi et al. ............ 709/230 |
| 2004/0076180 A1 | 4/2004 | Satapati et al. |
| 2004/0133692 A1 | 7/2004 | Blanchet |
| 2005/0276279 A1 | 12/2005 | Louis Peschi |
| 2006/0161673 A1 | 7/2006 | Moon et al. |
| 2006/0259639 A1 | 11/2006 | Aken et al. |
| 2008/0186202 A1 * | 8/2008 | Vaswani et al. .......... 340/870.03 |
| 2011/0013647 A1 * | 1/2011 | Park et al. ..................... 370/466 |
| 2011/0023105 A1 * | 1/2011 | Islam et al. ..................... 726/11 |

FOREIGN PATENT DOCUMENTS

| CN | 1585376 A | 2/2005 |
| CN | 1697421 A | 11/2005 |
| CN | 1706155 A | 12/2005 |

(Continued)

OTHER PUBLICATIONS

Nishitani et al.,"Carrier Grade Network Address Translator(NAT) Behavioral Requirements for Unicast UDP,TCP and ICMP," Internet Engineering Task Force Internet-Draft, Jul. 2, 2008, 16 pages.

(Continued)

*Primary Examiner* — John Pezzlo

(57) ABSTRACT

A method for forwarding data packet, a communication system, a Carrier Grade Network Address Translation (CGN) device, and an access gateway are provided. The CGN device communicates with the access gateway through an Internet Protocol Version 4 (IPv4) network and is used for receiving a first data packet forwarded by the access gateway and determining whether the first data packet is an IPv4 packet or an IPv6-over-IPv4 tunnel packet; forwarding the first data packet to the IPv4 network if the first data packet is the IPv4 packet; and decapsulating the first data packet if the first data packet is the IPv6-over-IPv4 tunnel packet to a first IPv6 packet, and sending the first IPv6 packet to an IPv6 network or the IPv4 network. Therefore, technical problems of fully utilizing the IPv4 network and, gradually increasing deployment of the IPv6 network, and realizing communication are solved.

22 Claims, 10 Drawing Sheets

FOREIGN PATENT DOCUMENTS

| | | |
|---|---|---|
| CN | 1708048 A | 12/2005 |
| CN | 1711739 A | 12/2005 |
| CN | 1949776 A | 4/2007 |
| CN | 101009941 A | 8/2007 |
| CN | 101160842 A | 4/2008 |
| CN | 101179468 A | 5/2008 |
| CN | 101447935 A | 6/2009 |
| JP | 2007300522 A | 11/2007 |
| WO | 0122683 A2 | 3/2001 |
| WO | 2004039014 A1 | 5/2004 |

OTHER PUBLICATIONS

Durand,"Dual-stack Lite Broadband Deployments Post IPv4 Exhaustion".Internet Engineering Task Force Internet-Draft, Jul. 7, 2008, 13 pages.

Chinese office action for Chinese application No. 200810219260.2, mailed May 27, 2010,and an English translation thereof, 16 pages.

International Publication and International Search Report issued in corresponding PCT Patent Application No. PCT/CN2009/072671,mailed Oct. 15, 2009, 29 pages.

Written Opinion of the International Searching Authority issued in corresponding PCT Patent Application No. PCT/CN2009/072671, mailed Oct. 15, 2009, 4 pages.

Corresponding granted Chinese Patent No. CN101447935B (Application No. 200810219260.2) citing prior art at Item (56), issued Dec. 21, 2011, 1 page only.

B. Carpenter et al.: "Transmission of IPv6 over IPv4 Domains without Explicit Tunnels," Network Working Group, Request for Comments: 2529, Category: Standards Track, Mar. 1999, 10 pages total.

European Search Report of corresponding European Patent Application No. 09827135.6, mailed on Dec. 12, 2011, 8 pages total.

Shirasaki et al.: "NAT444 with ISP Shared Address; draft-shirasakl-nat444-isp-shared-add r-00.txt", Internet Engineering Task Force, IETF; Standardworkingdraft, Internet Society (ISOC) 4, Rue Des Falaises CH—1205 Geneva, Switzerland, Oct. 27, 2008, XP015059912, Total 14 Pages.

Jiang et al.: "An Incremental Carrier-Grade NAT (CGN) for IPv6 Transition; draft-ji ang-v6ops-1ncrementa!-cgn-0I.txt", Internet Engineering Task Force, IETF; Standardworkingdraft, Internet Society(IS0C) 4, Rue Des Falaises CH—1205, Geneva, Switzerland, No. 1, Jun. 29, 2009, XP015062885, Total 12 Pages.

Nordmark et al.: "Basic Transition Mechanisms for IPv6 Hosts and Routers; rfc4213.txt", 5. JCT-VC Meeting; 96 Mar. 16, 2011-Mar. 23, 2011 Collaborative Team on Video Coding of IS0/IEC JTC1/SC29/WG11AND ITU-T SG.16 ); URL: HTTP://WFTP3.ITU.INT/AV-ARCH/JC TVC-SITE/, Internet Engineering Task Force, IETF, CH, Oct. 1, 2005, XP015054891, Total 28 Pages.

Tsirtsis et al.: "Network Address Translation—Protocol Translation (NAT-PT); rfc2766.txt", 5. JCT-VC Meeting; 96. MPEG Meeting; Mar. 16-23, 2011; Geneva; (Joint Collaborative Team on Video Coding of ISO/IEC JTC1/SC29/WG11AND ITU-T SG.16 ); URL: HTTP://WFTP3.ITU.INT/AV-ARCH/JC TVC-SITE/, Internet Engineering Task Force, IETF, CH, Feb. 1, 2000, XP015008549, Total 22 Pages.

Office Action of corresponding U.S. Appl. No. 13/111,662, mailed on Dec. 7, 2011, 12 pages total.

* cited by examiner

METHOD FOR FORWARDING DATA PACKET, SYSTEM, AND DEVICE

CROSS-REFERENCE TO RELATED APPLICATIONS

This application is a continuation of U.S. patent application Ser. No. 13/111,662, filed on May 19, 2011, which is a continuation of International Application No. PCT/CN2009/072671, filed on Jul. 7, 2009. The International Application claims priority to Chinese Patent Application No. 200810219260.2, filed on Nov. 20, 2008. The afore-mentioned patent applications are hereby incorporated by reference in their entireties.

FIELD OF THE TECHNOLOGY

The present invention relates to a network communication technology, and more particularly to a method for forwarding data packet, a system, and a device.

BACKGROUND OF THE INVENTION

With the development of communication technologies, computer networks enter all aspects of human lives. The second generation Internet based on the Internet Protocol Version 4 (IPv4) becomes a bottleneck of launching network services as IPv4 address resources are about to be exhausted soon. Thus, the Internet Engineering Task Force (IETF) provides a series of technology means for effectively slowing down IPv4 address exhaustion, which includes: Private IP Address Space; Dynamic IP Address Allocation; Variable Length Subnet Mask; Classless Inter-Domain Routing (CIDR); and Network Address Translation/Network Address Port Translation (NAT/NAPT). With the deployment of the 3G, Next Generation Network (NGN) and IP multimedia systems and the development trend of the all IP, a great amount of IP addresses need to be consumed, which forces to expedite commercial use of the Internet Protocol Version 6 (IPv6). However, transition from the IPv4 to the IPv6 involves enormous work of upgrading and modifying systems of hosts and routers, which is impossible to be accomplished in a short time, the IPv4 and the IPv6 will coexist in a long term. Hence, how to fully utilize the existing IPv4 network to gradually increase deployment of the IPv6 network and to realize communication is an industry focus.

SUMMARY OF THE INVENTION

Accordingly, the embodiments of the present invention are directed to a method for forwarding data packet, a communication system, a Carrier Grade Network Address Translation (CGN) device, and an access gateway, so as to solve technical problems of fully utilizing the IPv4 network, gradually increasing deployment of the IPv6 network, and realize communication.

According to a first aspect of the embodiments of the present invention, a method for forwarding data packet includes:

A CGN device receives a first data packet forwarded by an access gateway, and determines whether the first data packet is an IPv4 packet or an IPv6-over-IPv4 tunnel packet. If the first data packet is the IPv4 packet, the CGN device forwards the first data packet to an IPv4 network. If the first data packet is the IPv6-over-IPv4 tunnel packet, the CGN device decapsulates the first data packet to a first IPv6 packet, and sends the first IPv6 packet to an IPv6 network or the IPv4 network.

According to a second aspect of the embodiments of the present invention, a method for forwarding data packet includes:

An access gateway receives a first data packet from a client, and determines whether the first data packet is an IPv4 packet or a first IPv6 packet. If the first data packet is the IPv4 packet, the access gateway forwards the IPv4 packet to a CGN device. If the first data packet is the first IPv6 packet, the access gateway encapsulates the IPv6 packet into an IPv6-over-IPv4 tunnel packet and sends the IPv6-over-IPv4 tunnel packet to the CGN device through an IPv6-over-IPv4 tunnel.

According to a third aspect of the embodiments of the present invention, a communication system includes:

The CGN device, which communicates with an access gateway through a first IPv4 network, is configured to receive a first data packet forwarded by the access gateway and determine whether the first data packet is an IPv4 packet or an IPv6-over-IPv4 tunnel packet; forward the first data packet to a second IPv4 network if the first data packet is the IPv4 packet; and decapsulate the first data packet to a first IPv6 packet if the first data packet is the IPv6-over-IPv4 tunnel packet, and send the first IPv6 packet to an IPv6 network or the second IPv4 network.

According to a fourth aspect of the embodiments of the present invention, a CGN device includes: a receiver, a determining module, a first communication module, and a second communication module. The receiver receives a first data packet forwarded by an access gateway; and the determining module determines whether the first data packet is an IPv4 packet or an IPv6-over-IPv4 tunnel packet. If the determining module determines that the first data packet is the IPv4 packet, the first communication module forwards the first data packet to an IPv4 network. If the determining module determines that the first data packet is the IPv6-over-IPv4 tunnel packet, the second communication module decapsulates the first data packet to a first IPv6 packet, and sends the first IPv6 packet to an IPv6 network or the IPv4 network.

According to a fifth aspect of the embodiments of the present invention, an access gateway includes: a receiver, a determining unit, a first communication unit, and a second communication unit. The receiver receives a first data packet from a client; and the determining unit determines whether the first data packet received by the receiver is an IPv4 packet or a first IPv6 packet. If the determining unit determines that the first data packet is the IPv4 packet, the first communication unit, configured to forward the first data packet to a CGN device. If the determining unit determines that the first data packet is the first IPv6 packet, the second communication unit encapsulates the first IPv6 packet into an IPv6-over-IPv4 tunnel packet, and sends the IPv6-over-IPv4 tunnel packet to the CGN device through an IPv6-over-IPv4 tunnel.

By implementing the methods for forwarding data packet, the communication system, the CGN device, and the access gateway according to the embodiments of the present invention, at the same time of realizing network communication, the existing IPv4 network and devices are fully utilized, and the deployment of the IPv6 network can be gradually increased. Resource utilization is effectively increased, and networking cost is reduced, so as to facilitate smooth transition of communication technologies.

DETAILED DESCRIPTION OF THE EMBODIMENTS

In order to enable persons skilled in the art to more clearly understand technical solutions according to embodiments of the present invention, a method for forwarding data packet and a communication system according to embodiments of the present invention is set forth hereinafter in detail in combination with accompanying drawings.

In the embodiments of the present invention, a CGN device and an access gateway are deployed in a network. The access gateway integrates an IPv4 forwarding function and an IPv6-over-IPv4 tunnel function, and alternatively, may further integrate an IPv4-IPv4 NAT function. The CGN device integrates the IPv6-over-IPv4 tunnel function and the IPv4-IPv4 NAT function, and alternatively, may further integrate an NAT-protocol translation (PT) function.

Figure 1:
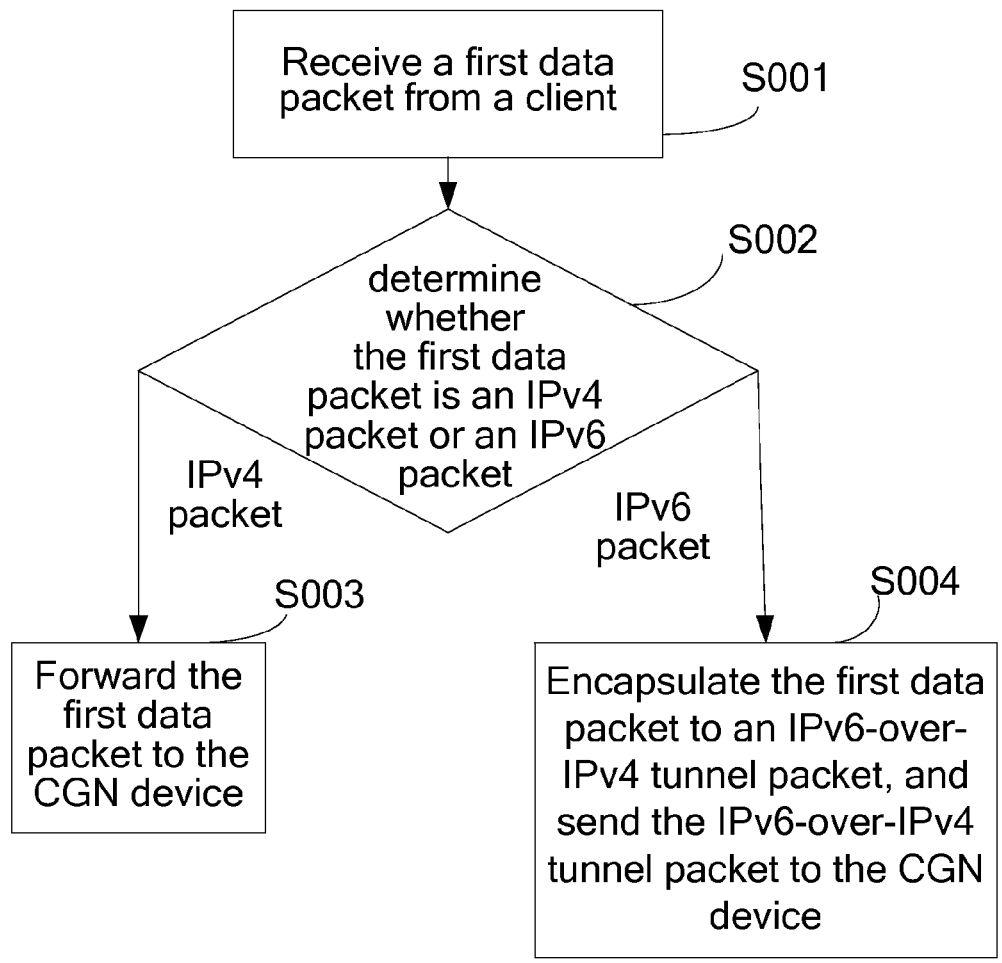
FIG. 1 is a flow chart of forwarding a data packet by an access gateway according to an embodiment of the present invention.

FIG. 1 illustrates a method for forwarding data packet according to an embodiment of the present invention, which includes the following blocks.

S001, an access gateway receives a first data packet from a client.

S002, the access gateway determines whether the first data packet is a first IPv4 packet or a first IPv6 packet according to an IP protocol number in a header of the first data packet.

S003, the access gateway forwards the first data packet to a CGN device if the first data packet is the first IPv4 packet.

S004, the access gateway encapsulates the first data packet into a first IPv6-over-IPv4 tunnel packet if the first data packet is the first IPv6 packet, and sends the first IPv6-over-IPv4 tunnel packet to the CGN device through an IPv6-over-IPv4 tunnel.

Figure 2:
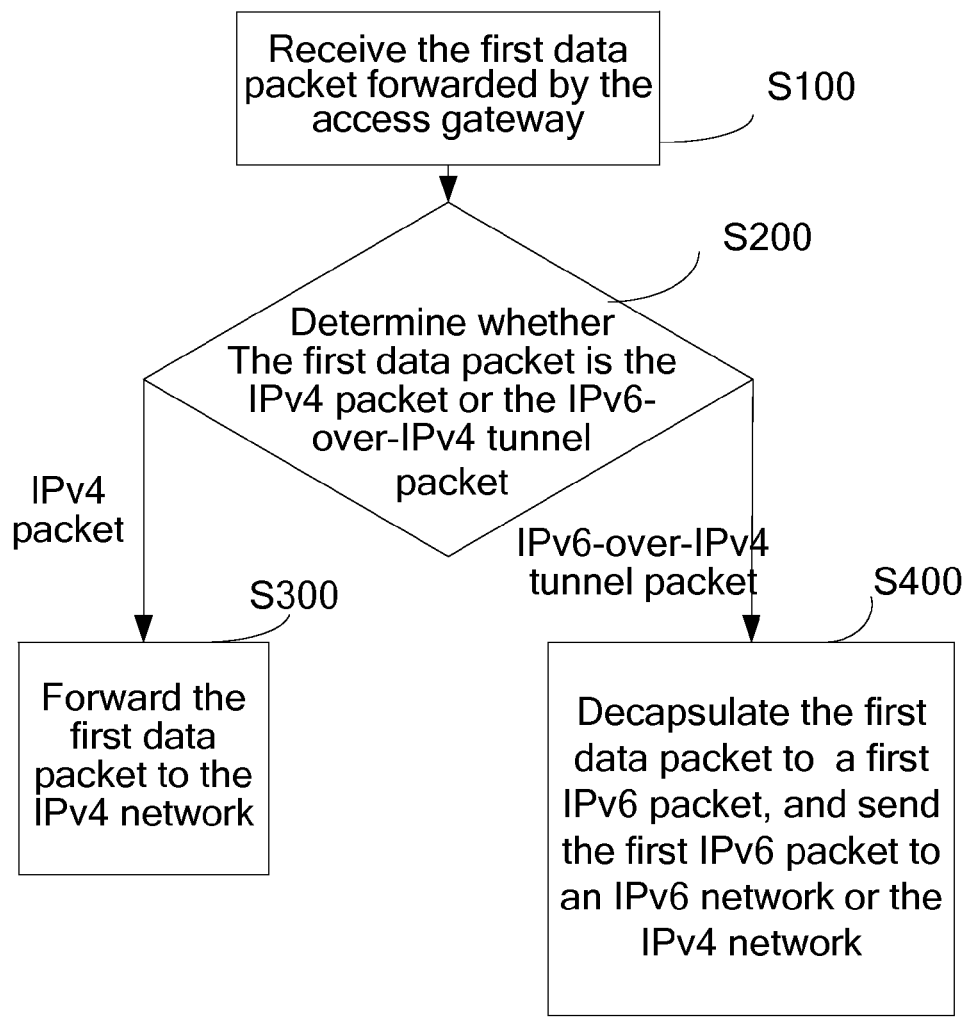
FIG. 2 is a flow chart of forwarding a data packet by a CGN device according to an embodiment of the present invention.

In the embodiment of the present invention, after receiving a first data packet from an access gateway, a CGN device processes the first data packet as shown in FIG. 2, which includes the following blocks.

S100, the CGN device receives the first data packet forwarded by the access gateway.

S200, the CGN device determines whether the first data packet is a first IPv4 packet or a first IPv6-over-IPv4 tunnel packet according to information in the header of the first data packet. Specifically, when the first data packet has two or more than two headers, and a protocol number in an outer header is IPv4, the first data packet is the first IPv6-over-IPv4 tunnel packet; when it only has one header, and the protocol number is IPv4, the first data packet is the first IPv4 packet.

S300, the CGN device forwards the first data packet to an IPv4 network if the first data packet is the first IPv4 packet.

Alternatively, in S400, the CGN device decapsulates the first data packet to a first IPv6 packet if the first data packet is the first IPv6-over-IPv4 tunnel packet, and sends the first IPv6 packet to an IPv6 network or the IPv4 network.

Figure 3:
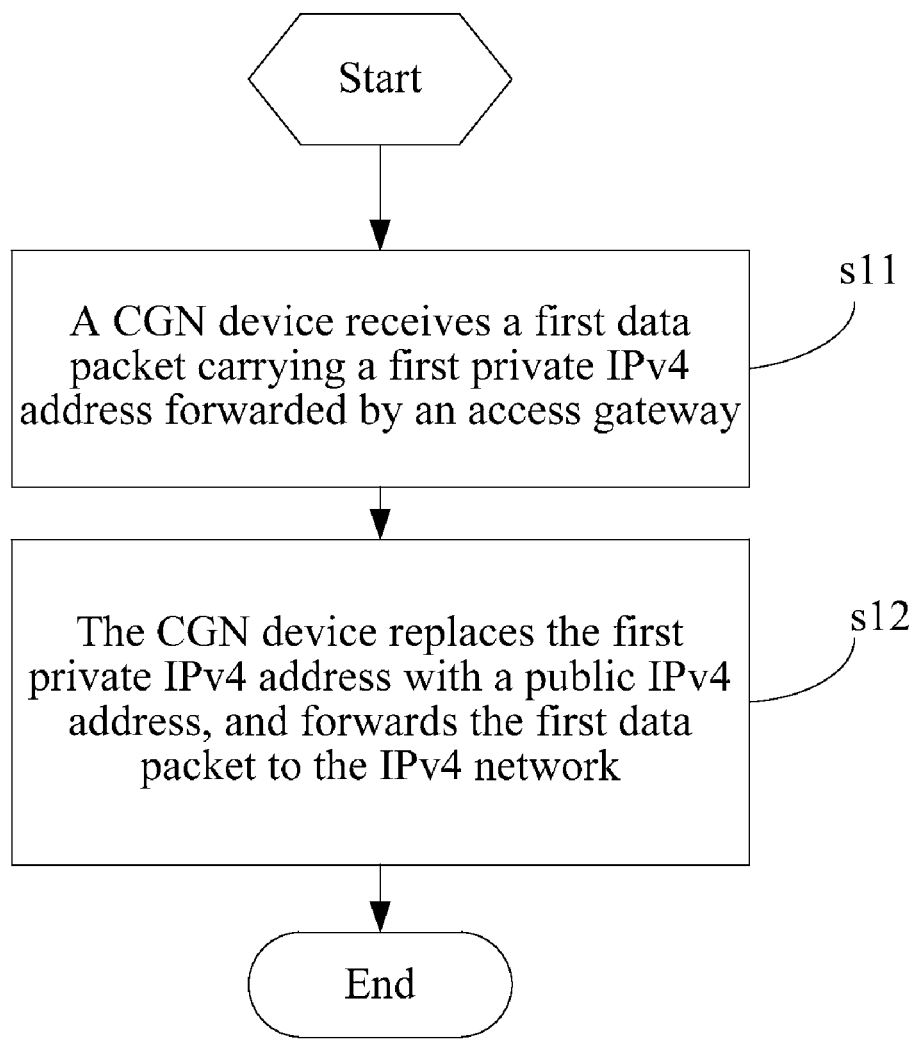
FIG. 3 is a flow chart of forwarding IPv4 traffic according to an embodiment of the present invention.

As shown in FIG. 3, forwarding of a data packet from an IPv4 client or a dual stack client through the IPv4 Protocol includes the following blocks.

S11, a CGN device receives a first data packet carrying a first private IPv4 address forwarded by an access gateway.

S12, the CGN device replaces the first private IPv4 address with a public IPv4 address, records a first mapping relationship between the public IPv4 address and the first private IPv4 address, and forwards the first data packet carrying the public IPv4 address to an IPv4 network. The first mapping relationship includes: a corresponding relationship between the public IPv4 address and the first private IPv4 address, and/or a corresponding relationship among the public IPv4 address, the first private IPv4 address and a first private port number.

Before S11, if the IPv4 client has no public IPv4 address, the method may further include: the access gateway replaces a second private IPv4 address of the first data packet from the IPv4 client or the dual stack client with the first private IPv4 address, records a second mapping relationship between the second private IPv4 address and the first private IPv4 address, and forwards the first data packet carrying the first private IPv4 address to the CGN device. The second mapping relationship includes: a corresponding relationship between the second private IPv4 address and the first private IPv4 address, and/or a corresponding relationship among the first private IPv4 address, the second private IPv4 address and a second private port number.

It should be noted that, when the CGN device receives a second data packet carrying the public IPv4 address from the IPv4 network, the method may further include the following blocks.

The CGN device replaces the public network IPv4 address with the first private IPv4 address according to the first mapping relationship, and forwards the second data packet carrying the first private IPv4 address to the access gateway.

Further, the access gateway receives the second data packet carrying the first private IPv4 address forwarded by the CGN device, translates the first private IPv4 address into the second private IPv4 address according to the second mapping relationship, and forwards the second data packet carrying the second private IPv4 address to the IPv4 client or the dual stack client.

Figure 4:
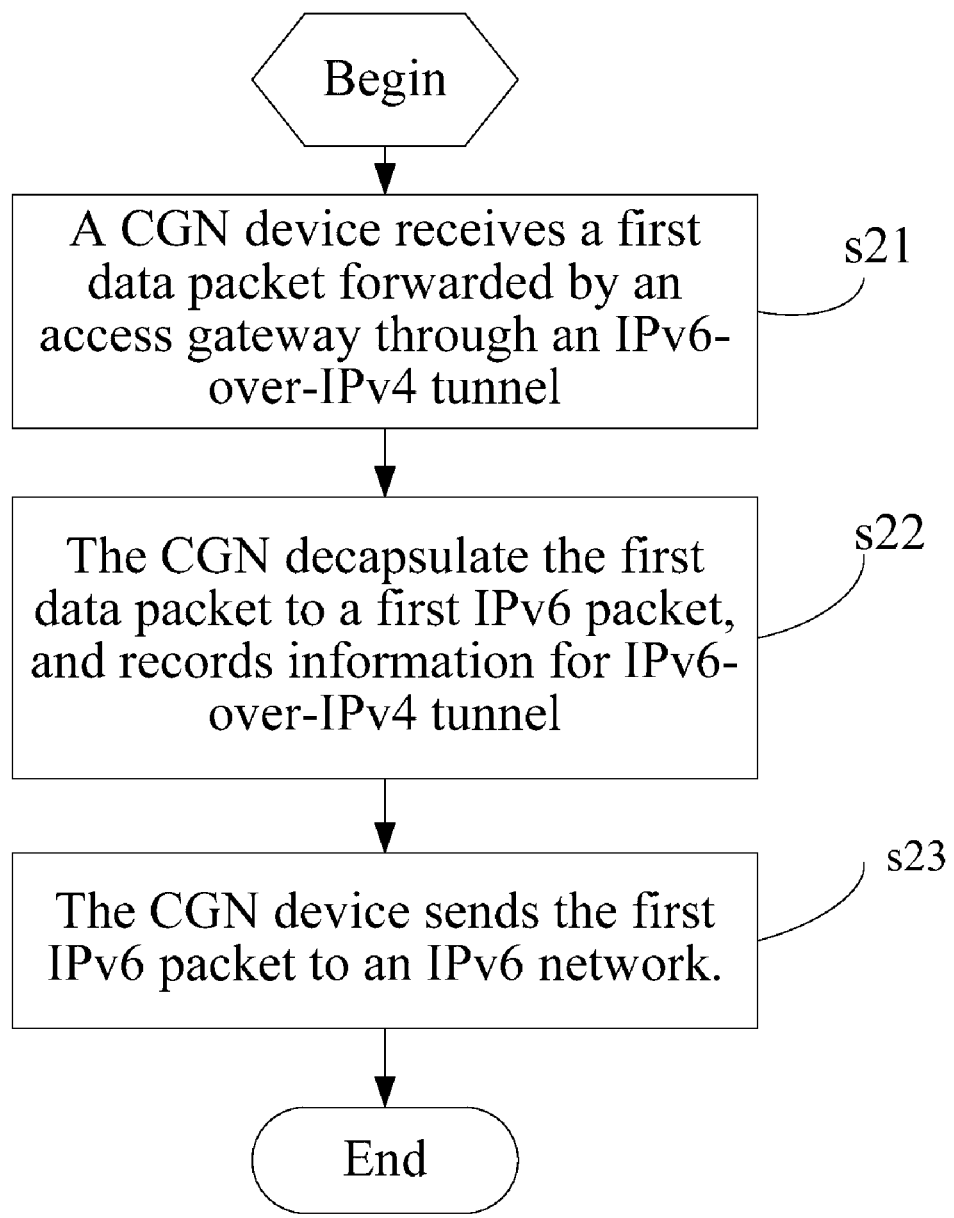
FIG. 4 is a flow chart of forwarding IPv6 traffic according to an embodiment of the present invention.

As shown in FIG. 4, forwarding of a data packet from an IPv6 client or a dual stack client through the IPv6 Protocol includes the following blocks.

S21, a CGN device receives a first data packet forwarded by an access gateway through an IPv6-over-IPv4 tunnel.

S22, the CGN device decapsulates the first data packet to a first IPv6 packet, and records information about the IPv6-over-IPv4 tunnel. The information about the IPv6-over-IPv4 tunnel includes: a tunnel number, a private IPv4 address of a starting point of the tunnel, and an IPv6 address corresponding to the tunnel.

S23, the CGN device sends the first IPv6 packet to an IPv6 network or an IPv4 network.

Before S21, the method may include the following blocks.

The access gateway encapsulates the first IPv6 packet from the IPv6 client or the dual stack client into the first data packet, and sends the first data packet to the CGN device through the IPv6-over-IPv4 tunnel.

During specific implementation, in S23, the sending of the first IPv6 packet to the IPv4 network includes the following blocks.

The CGN device translates the first IPv6 packet to a second IPv4 packet, and records NAT-PT mapping information, and sends the second IPv4 packet to the IPv4 network.

The translating, by the CGN device, the first IPv6 packet to the second IPv4 packet includes that: The CGN device replaces the IPv6 address in the first IPv6 packet with a public IPv4 address, thereby constructing the second IPv4 packet, and records an NAT-PT mapping relationship between the public IPv4 address and the IPv6 address.

When receiving a second data packet from the IPv4 network, the CGN device translates the second data packet to a second IPv6 packet according to the recorded NAT-PT mapping relationship. Specifically, the CGN device replaces the public IPv4 address with the IPv6 address, obtaining the second IPv6 packet.

It should be noted that when the CGN device receives a second IPv6 packet from the IPv6 network or obtains the second IPv6 packet by translating the received IPv4 packet with NAT-PT function, the method may further include the following blocks.

The CGN device encapsulates the second IPv6 packet into a second IPv6-over-IPv4 tunnel packet according to the recorded information about the IPv6-over-IPv4 tunnel, and sends the second IPv6-over-IPv4 tunnel packet to the access gateway through the IPv6-over-IPv4 tunnel.

Further, the access gateway receives the second IPv6-over-IPv4 tunnel packet sent by the CGN device through the IPv6-over-IPv4 tunnel, decapsulates the second IPv6-over-IPv4 tunnel packet to the second IPv6 packet, and sends the second IPv6 packet to the client.

According to a method for forwarding data packet in an embodiment of the present invention, for a data packet carrying a first private IPv4 address, an access gateway directly forwards the data packet to a CGN device. For a data packet carrying a second private IPv4 address, the access gateway translates the second private IPv4 address into the first private IPv4 address, and then sends the data packet to the CGN device; the CGN device translates the first private IPv4 address into a public IPv4 address, and then forwards the data packet to a IPv4 network. For an IPv6 packet, the access gateway encapsulates the IPv6 packet into an IPv6-over-IPv4 tunnel packet, and sends the IPv6-over-IPv4 tunnel packet to the CGN device through an IPv6-over-IPv4 tunnel; the CGN device decapsulates the IPv6-over-IPv4 tunnel packet to the IPv6 packet, and then sends the IPv6 packet to an IPv6 network. Therefore, the existing IPv4 network and devices are fully utilized, and the deployment of the IPv6 network can be gradually increased. Resource utilization is effectively increased, and networking cost is reduced, so as to facilitate smooth transition of communication technologies.

Figure 5:
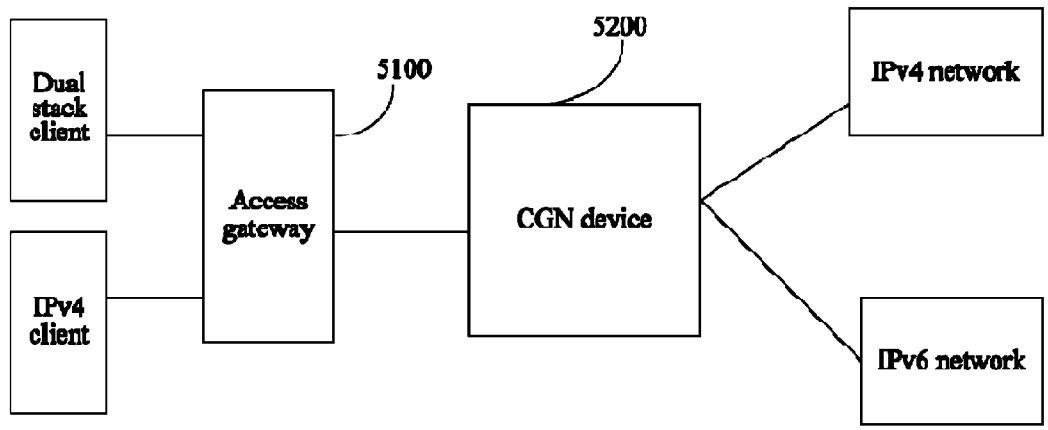
FIG. 5 is a structural block diagram of a communication system according to an embodiment of the present invention.

Correspondingly, as shown in FIG. 5, an embodiment of the present invention provides a communication system, which includes a CGN device 5200 and an access gateway 5100.

The CGN device 5200 communicates with the access gateway 5100 through a first IPv4 network, and is configured to receive a first data packet forwarded by the access gateway 5100 and determine whether the first data packet is a first IPv4 packet or a first IPv6-over-IPv4 tunnel packet; forward the first data packet to a second IPv4 network if the first data packet is the first IPv4 packet; and decapsulate the first data packet to a first IPv6 packet if the first data packet is the first IPv6-over-IPv4 tunnel packet, and send the first IPv6 packet to an IPv6 network or the second IPv4 network.

The access gateway 5100 is configured to receive the first data packet from a client (such as an IPv4 client or a dual stack client), and determine whether the first data packet is the first IPv4 packet or the first IPv6 packet; forward the first data packet to the CGN device if the first data packet is the first IPv4 packet; and encapsulates the first data packet into the first IPv6-over-IPv4 tunnel packet if the first data packet is the first IPv6 packet, and send the first IPv6-over-IPv4 tunnel packet to the CGN device through an IPv6-over-IPv4 tunnel.

During specific implementation, the CGN device 5200 is further configured to receive a second data packet from the second IPv4 network, and forward the second data packet to the access gateway 5100; or receive a second IPv6 packet from the IPv6 network, encapsulate the IPv6 packet into a second IPv6-over-IPv4 tunnel packet, and send the second IPv6-over-IPv4 tunnel packet to the access gateway 5100 through the IPv6-over-IPv4 tunnel. The access gateway 5100 is configured to forward the second data packet forwarded by the CGN 5200 device to the IPv4 client; or decapsulate the second IPv6-over-IPv4 tunnel packet to the second IPv6 packet, and send the second IPv6 packet to the dual stack client.

Figure 6:
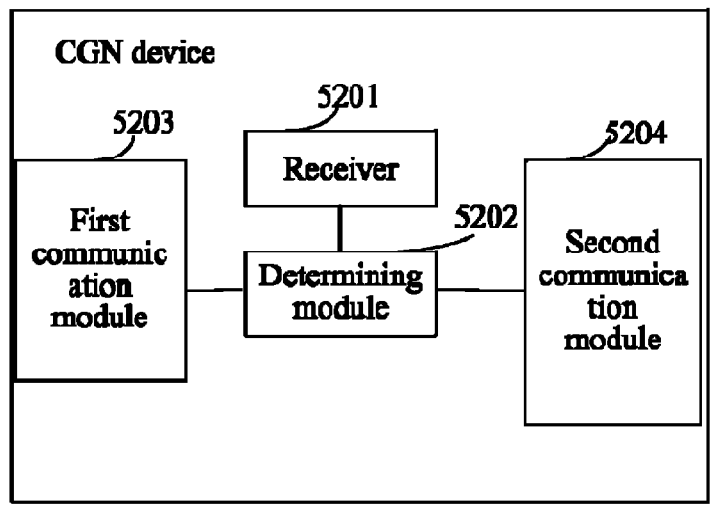
FIG. 6 illustrates the CGN device in FIG. 5 according to a first embodiment.

According to an aspect of the embodiment of the present invention, as shown in FIG. 6, a CGN device includes a receiver 5201, a determining module 5202, a first communication module 5203, and a second communication module 5204.

The receiver 5201 is configured to receive a first data packet forwarded by an access gateway.

The determining module 5202 is configured to determine whether the first data packet is a first IPv4 packet or a first IPv6-over-IPv4 tunnel packet.

The first communication module 5203 is configured to forward the first data packet to an IPv4 network if the determining module 5202 determines that the first data packet is the first IPv4 packet.

The second communication module 5204 is configured to decapsulate the first data packet to a first IPv6 packet if the determining module 5202 determines that the first data packet is the first IPv6-over-IPv4 tunnel packet, and send the first IPv6 packet to an IPv6 network or the IPv4 network.

Figure 7:
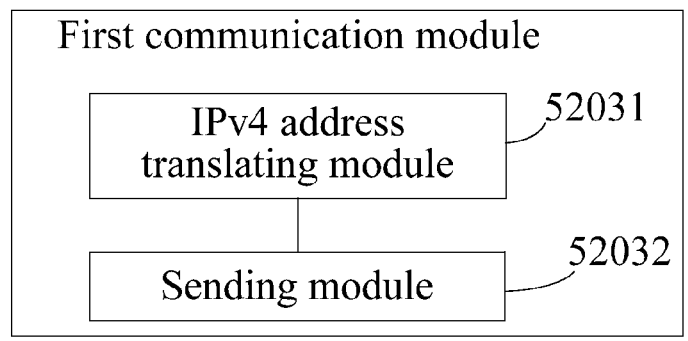
FIG. 7 is a structural block diagram of the first communication module in FIG. 6.

As shown in FIG. 7, the first communication module 5203 includes an IPv4 address translating module 52031 and a sending module 52032.

The IPv4 address translating module 52031 is configured to replace a first private IPv4 address carried in the first data packet with a public IPv4 address.

The sending module 52032 is configured to forward the first data packet carrying the public IPv4 address to the IPv4 network.

Figure 8:
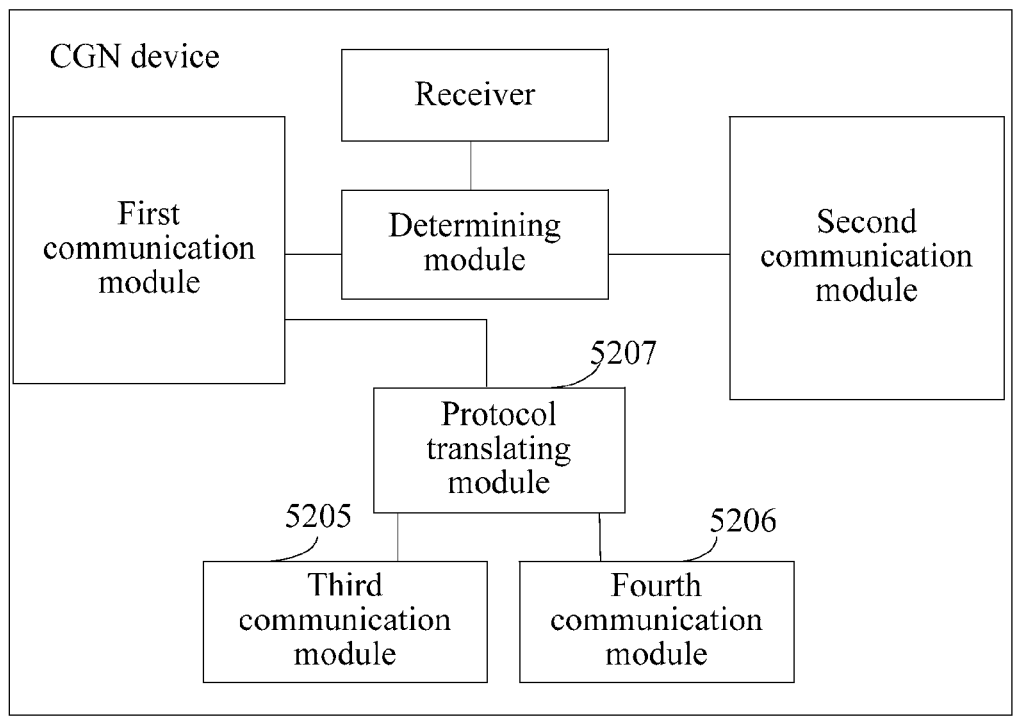
FIG. 8 illustrates the CGN device in FIG. 5 according to a second embodiment.

According to another aspect of the embodiment of the present invention, as shown in FIG. 8, in addition to the structure in FIG. 6, the CGN device may further include a third communication module 5205 and a fourth communication module 5206.

The third communication module 5205 is configured to replace the public IPv4 address carried in a second data packet with the first private IPv4 address when receiving the second data packet from the IPv4 network, and forward the second data packet carrying the first private IPv4 address to the access gateway.

The fourth communication module 5206 is configured to encapsulate a second IPv6 packet into a second IPv6-over- IPv4 tunnel packet according to recorded information about IPv6-over-IPv4 tunnel when receiving the second IPv6 packet from the IPv6 network, and send the second IPv6-over-IPv4 tunnel packet to the access gateway through an IPv6-over-IPv4 tunnel.

During specific implementation, the CGN device may further include a protocol translating module 5207, which is configured to translate the first IPv6 packet obtained by the second communication module 5204 to a second IPv4 packet, and send the second IPv4 packet to an IPv4 network; or to translate the second data packet received by the third communication module 5205 to a third IPv6 packet, and send the third IPv6 packet to the fourth communication module 5206.

Figure 9:
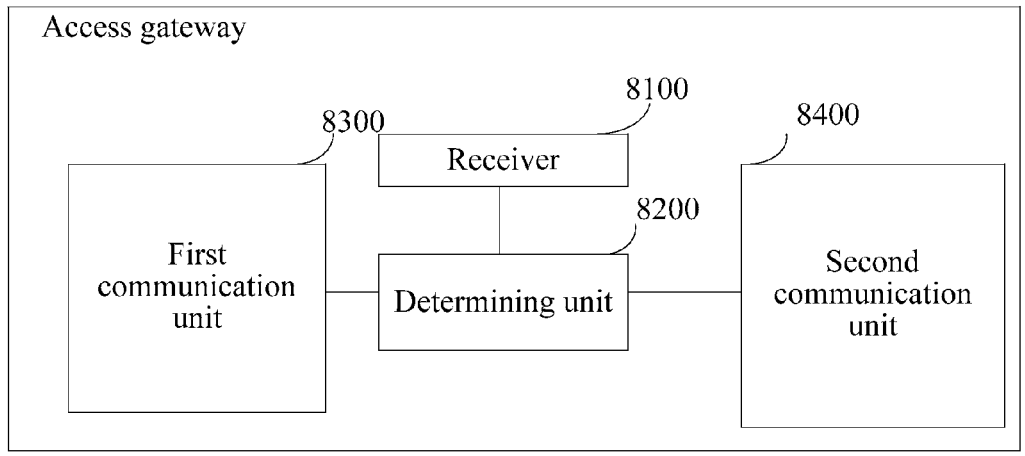
FIG. 9 illustrates the access gateway in FIG. 5 according to a first embodiment.

As shown in FIG. 9, in the communication system in FIG. 5, the access gateway includes a receiver 8100, a determining unit 8200, a first communication unit 8300, and a second communication unit 8400.

The receiver 8100 is configured to receive a first data packet from a client.

The determining unit 8200 is configured to determine whether the first data packet received by the receiver 8100 is a first IPv4 packet or a first IPv6 packet.

The first communication unit 8300 is configured to forward the first data packet to a CGN device if the determining unit 8200 determines that the first data packet is the first IPv4 packet.

The second communication unit 8400 is configured to encapsulate the first data packet into a first IPv6-over-IPv4 tunnel packet if the determining unit 8200 determines that the first data packet is the first IPv6 packet, and send the first IPv6-over-IPv4 tunnel packet to the CGN device through an IPv6-over-IPv4 tunnel.

Figure 10:
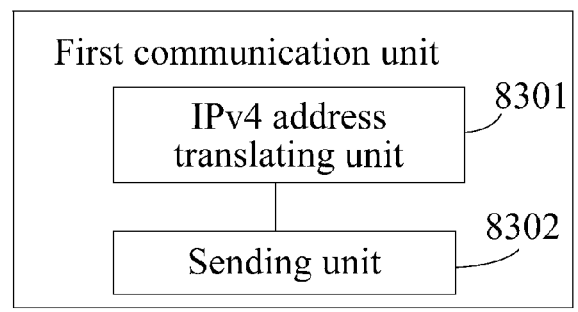
FIG. 10 is a structural block diagram of the first communication unit in FIG. 9.

As shown in FIG. 10, the first communication unit 8300 includes an IPv4 address translating unit 8301 and a sending unit 8302.

The IPv4 address translating unit 8301 is configured to replace a second private IPv4 address carried in the first data packet with a first private IPv4 address.

The sending unit 8302 is configured to send the first data packet carrying the first private IPv4 address to the CGN device.

Figure 11:
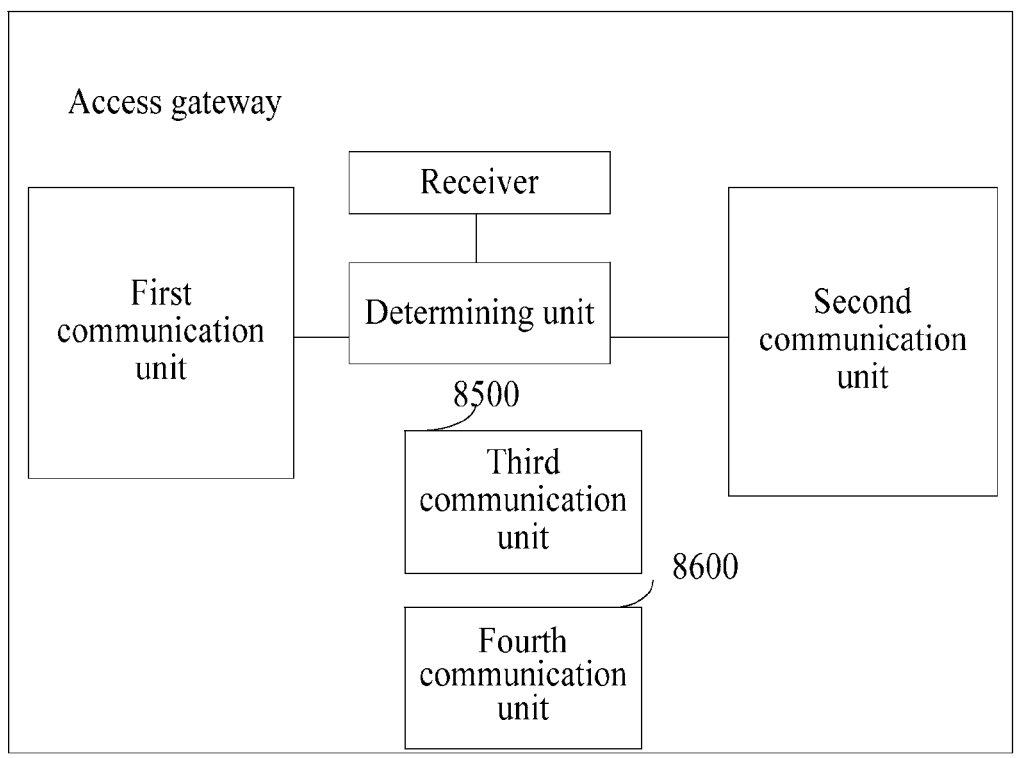
FIG. 11 illustrates the access gateway in FIG. 5 according to a second embodiment.

In another embodiment of the present invention, as shown in FIG. 11, the access gateway may further include a third communication unit 8500 and a fourth communication unit 8600.

The third communication unit 8500 is configured to replace the first private IPv4 address carried in a second data packet forwarded by the CGN device with a second private IPv4 address, and forward the second data packet to the client.

The fourth communication unit 8600 is configured to decapsulate a second IPv6-over-IPv4 tunnel packet sent by the CGN device through the IPv6-over-IPv4 tunnel to a second IPv6 packet, and send the second IPv6 packet to a dual stack client.

According to a communication system in an embodiment of the present invention, for a data packet carrying a first private IPv4 address, an access gateway directly forwards the data packet to a CGN device. For a data packet carrying a second private IPv4 address, the access gateway translates the second private IPv4 address into the first private IPv4 address, sends the data packet to the CGN device; the CGN device translates the first private IPv4 address into a public IPv4 address, and then forwards the data packet to an IPv4 network. For an IPv6 data packet, the access gateway encapsulates the IPv6 data packet into an IPv6-over-IPv4 tunnel packet, and sends the IPv6-over-IPv4 tunnel packet to the CGN device through an IPv6-over-IPv4 tunnel; the CGN device decapsulates the IPv6-over-IPv4 tunnel packet to the IPv6 packet, and then sends the IPv6 packet to an IPv6 network. Furthermore, by integrating an NAT-PT function, interworking between IPv6 and IPv4 is realized, so that the existing IPv4 network and devices are fully utilized, and the deployment of the IPv6 network can be gradually increased. Resource utilization is effectively increased, and networking cost is reduced, so as to facilitate smooth transition of communication technologies.

In order to make technical solutions implemented in the embodiment of the present invention be further understood, the following preferred implementation modes are provided.

In a first mode, an access gateway integrates an IPv4-IPv4 translation function and an IPv6-over-IPv4 tunnel function, and a CGN device integrates an IPv4-IPv4 translation function and the IPv6-over-IPv4 tunnel function.

Figure 12:
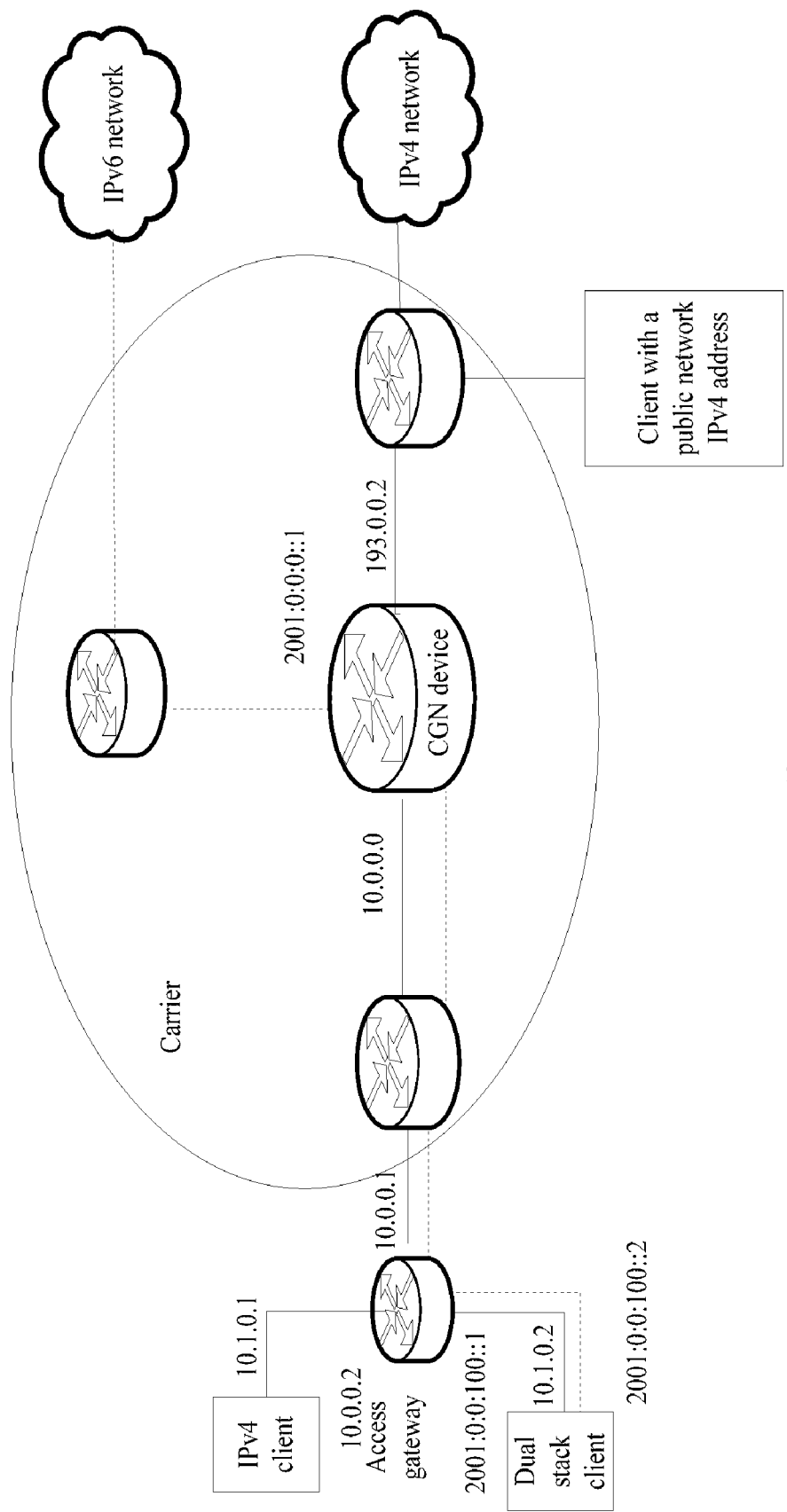
FIG. 12 illustrates a first preferred implementation mode of the present invention.

As shown in FIG. 12, an IPv4 client and a dual stack client communicate with an access gateway respectively, the access gateway communicates with a CGN device through the IPv4 Protocol, and the CGN device is connected to an IPv6 network and an IPv4 network.

The access gateway applies multiple private IPv4 addresses (such as, first private addresses according to the embodiments of the present invention) from the CGN device. 10.1.0.1 is allocated to the IPv4 client and 10.1.0.2 is allocated to an IPv4 port of the dual stack client. A local area network (LAN) interface address of the access gateway is 10.0.0.2, and a wide area network (WAN) interface address of the access gateway is 10.0.0.1. A private IPv4 address of the CGN device is 10.0.0.0, and a public IPv4 address of the CGN device is 193.0.0.2.

The CGN device distributes a private IPv6 address with a prefix 2001:0:0:100/56 to the access gateway. Both an internal interface of the access gateway and an IPv6 port of the dual stack client use addresses within the address segment, such as 2001:0:0:100::1 and 2001:0:0:100::2. An IPv6address of the CGN device is 2001:0:0:0::1.

When IPv4 traffic (or a message or a data packet) of the IPv4 client or the IPv4 port of the dual stack client arrives the access gateway, for example, a source address carried in the traffic (or the message or the data packet) of the IPv4 client is 10.1.0.1, the access gateway directly forwards the traffic (or the message or the data packet) to the CGN device. After IPv6 traffic of an IPv6 port of the dual stack client arrives the access gateway, the access gateway encapsulates the IPv6 traffic into IPv6-over-IPv4 tunnel traffic, and then sends the IPv6-over-IPv4 tunnel traffic to the CGN device through an IPv6-over-IPv4 tunnel.

After receiving the traffic, the CGN device determines whether the traffic is IPv4traffic or traffic from the IPv6-over-IPv4 tunnel. For the IPv4 traffic, the CGN device translates the first private IPv4 address 10.1.0.1 into the public IPv4 address 193.0.0.2, and then the IPv4 traffic is forwarded to the IPv4 network. For the traffic from the IPv6-over-IPv4 tunnel, the CGN device decapsulates the traffic to the IPv6 traffic, and the IPv6 traffic is directly forwarded to the IPv6 network. The CGN device records information about the IPv6-over-IPv4 tunnel, such as a tunnel number and a private IPv4 address (such as 10.0.0.1) of a starting point of the tunnel. When the CGN device has multiple internal ports (that is, private network ports), an internal port number and an IPv6 address corresponding to the tunnel are recorded. For the traffic delivered from the IPv4 or IPv6 network, processing of the CGN device and the access gateway is similar to that in the foregoing, the description of which is not described repeatedly here.

In a second mode, the access gateway integrates an IPv4-IPv4 address translation function and the IPv6-over-IPv4 tunnel function, and the CGN device integrates the IPv4-IPv4 address translation function and the IPv6-over-IPv4 tunnel function. The access gateway communicates with the CGN device through the IPv4 Protocol.

In the case that the private IPv4 address of the LAN interface of the access gateway is different from the private IPv4 address of the WAN interface of the access gateway, a Home Gateway (HG) needs translate a second private IPv4 address into a first private IPv4 address delivered by CGN device.

Figure 13:
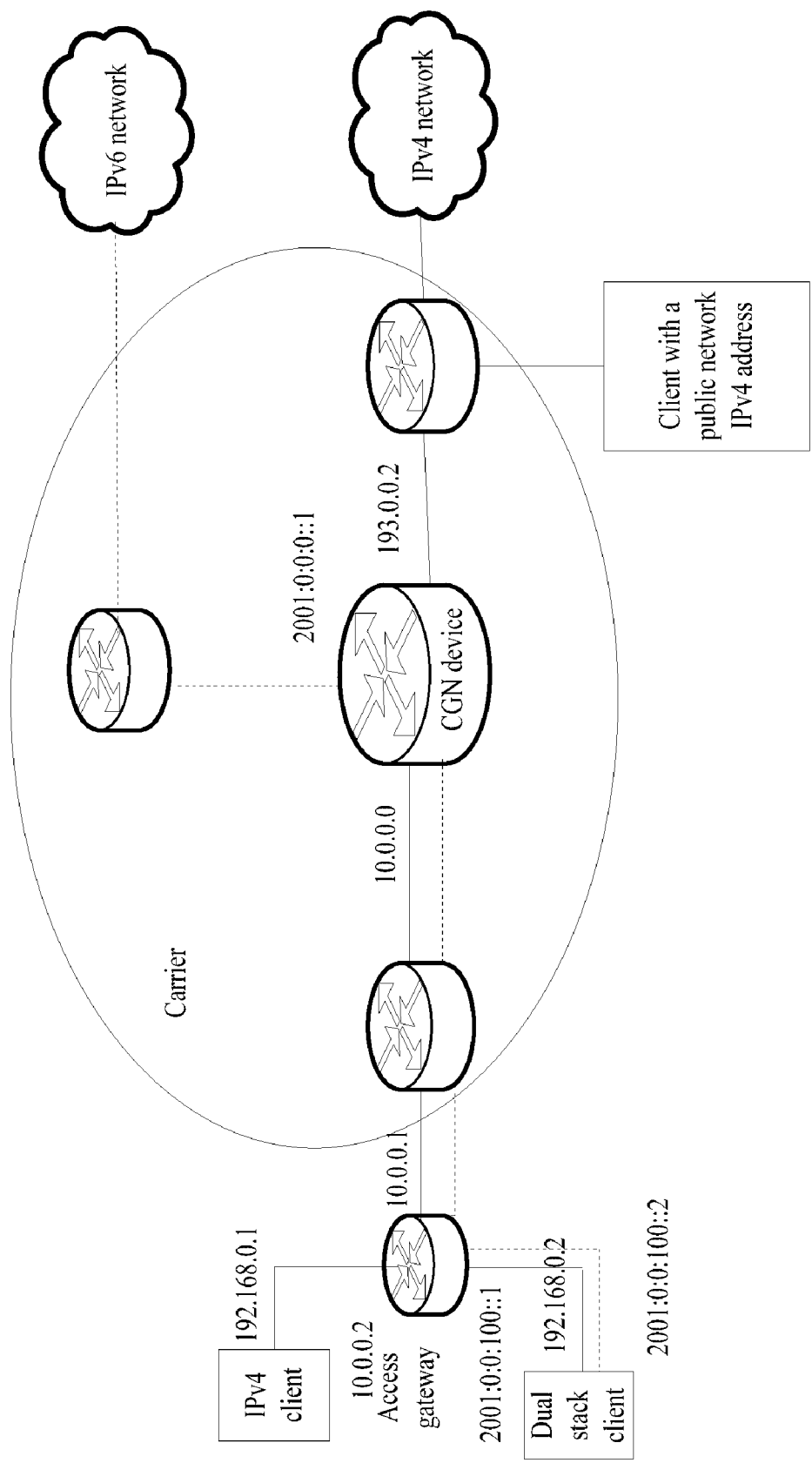
FIG. 13 illustrates a second preferred implementation mode of the present invention.

As shown in FIG. 13, a CGN device distributes a first private IPv4 address to an access gateway manually or with Dynamic Host Configuration Protocol (DHCP) v4, such as 10.0.0.1 (used by a WAN interface), and the CGN device also uses a private IPv4 address 10.0.0.0 internally. The access gateway distributes a second private IPv4 address downwards, which belongs to independent space for IPv4 private address. As shown in FIG. 13, an internal interface (LAN interface) of the access gateway uses 192.168.0.0, an IPv4 client uses 192.168.0.1, and an IPv4 port of a dual stack client uses 192.168.0.2. For IPv4 traffic from a client, the access gateway translates the second private IPv4 address 192.168.0.1 into a first private IPv4 address 10.0.0.1, and forwards the IPv4 traffic to the CGN device. The CGN device replaces the 10.0.0.1 with a public IPv4 address, such as 193.0.0.2, and forwards the IPv4 traffic to an IPv4 network. For a reverse IPv4 traffic, the CGN device translates the public IPv4 address into the first private IPv4 address, and forwards the IPv4 traffic to the access gateway. When the IPv4 traffic arrives the access gateway, the access gateway translates the first private IPv4 address into the second private IPv4 address and forwards the IPv4 traffic to the client. Processing for the IPv6 traffic is similar to that in the first mode, the description of which is not described repeatedly here.

Persons skilled in the art should understand that, the CGN device may further integrates an NAT-PT function of IPv6-IPv4, and therefore interconnecting and interworking between IPv6-only and IPv4-only are supported.

Through the descriptions of the preceding embodiments, persons skilled in the art may understand that the embodiments of the present invention may be implemented by using by using software plus a necessary universal hardware platform or by using hardware only. Based on such understanding, all or part of the technical solution under the present invention that makes contributions to the prior art may be essentially embodied in the form of a software product. The software product may be stored in a storage medium, which can be a Read-Only Memory (ROM)/Random Access Memory (RAM), a magnetic disk, and an optical disk. The software product includes a number of instructions that enable a computer device (a personal computer, a server, or a network device) to execute the methods provided in the embodiments of the present invention.

According to a method for forwarding data packet and a communication system in the embodiments of the present invention, for a data packet with a first private IPv4 address, an access gateway directly forwards it to a CGN device. For a data packet with a second private IPv4 address, the access gateway first translates the source address of the data packet into a second private IPv4 address, then sends the data packet to the CGN device. The CGN device translates the first private IPv4 address into a public IPv4 address, and then forwards the data packet to an IPv4 network. For an IPv6 data packet, the access gateway encapsulates the IPv6 data packet into an IPv6-over-IPv4 tunnel packet, and sends the IPv6-over-IPv4 tunnel packet to the CGN device through an IPv6-over-IPv4 tunnel. The CGN device decapsulates the IPv6-over-IPv4 tunnel packet to the IPv6 packet, and then sends the IPv6 packet to an IPv6 network. Therefore, the existing IPv4 network and devices are fully utilized, and the deployment of the IPv6 network can be gradually increased. Resource utilization is effectively increased, and networking cost is reduced, so as to facilitate smooth transition of communication technologies.

The foregoing description is merely a preferred embodiment of the present invention, but not intended to limit the scope of the present invention. Equivalent changes made according to the appended claims of the present invention should fall within the scope of the present invention.

What is claimed is:

1. A method for forwarding data packet, comprising:
 receiving, by a Carrier Grade Network Address Translation (CGN) device, a first data packet forwarded by an access gateway;
 determining, by the CGN device, whether the first data packet is a first Internet Protocol Version 4 (IPv4) packet or a first Internet Protocol Version 6 (IPv6) -over-IPv4 tunnel packet according to information in a header of the first data packet;
 forwarding, by the CGN device, the first data packet to an IPv4 network if the first data packet is the first IPv4 packet; and
 decapsulating, by the CGN device, the first data packet to a first IPv6 packet and sending the first IPv6 packet to an IPv6 network if the first data packet is the first IPv6-over-IPv4 tunnel packet.

2. The method according to claim 1, wherein the forwarding the first data packet to the IPv4 network if the first data packet is the first IPv4 packet comprises:
 replacing, by the CGN device, a first private IPv4 address in the first data packet with a public IPv4 address, and
 forwarding, by the CGN device, the first data packet carrying the public IPv4 address to the IPv4 network.

3. The method according to claim 2, further comprising:
 recording, by the CGN device, a first mapping relationship after replacing the first private IPv4 address in the first data packet with the public IPv4 address.

4. The method according to claim 3, wherein the first mapping relationship comprises a corresponding relationship between the public IPv4 address and the first private IPv4 address.

5. The method according to claim 3, wherein the first mapping relationship comprises a corresponding relationship among the public IPv4 address, the first private IPv4 address and a first private port number.

6. The method according to claim 3, wherein when receiving a second data packet carrying the public IPv4 address from the IPv4 network, the method further comprises:
 replacing, by the CGN device, the public IPv4 address of the second data packet with the first private IPv4 address according to the first mapping relationship; and
 forwarding, by the CGN device, the second data packet carrying the first private IPv4 address to the access gateway.

7. The method according to claim 1, further comprising:
 recording, by the CGN device, information about an IPv6-over-IPv4 tunnel after decapsulating the first data packet to the first IPv6 packet.

8. The method according to claim 7, wherein the information about the IPv6-over-IPv4 tunnel comprises a tunnel number, a private IPv4 address of a starting point of the tunnel, and an IPv6 address corresponding to the tunnel.

9. The method according to claim 7, wherein when receiving a second IPv6 packet from the IPv6 network, the method further comprises:
 encapsulating, by the CGN device, the second IPv6 packet to a second IPv6-over-IPv4 tunnel packet according to the information about the IPv6-over-IPv4 tunnel, and sending the second IPv6-over-IPv4 tunnel packet to the access gateway through the IPv6-over-IPv4 tunnel.

10. A method for forwarding data packet, comprising:
receiving, by an access gateway, a first data packet from a client;
determining, by the access gateway, whether the first data packet is a first Internet Protocol Version 4 (IPv4) packet or a first Internet Protocol Version 6 (IPv6) packet according to an IP number in a header of the first data packet;
forwarding, by the access gateway, the first data packet to a Carrier Grade Network Address Translation (CGN) device if the first data packet is the first IPv4 packet; and
encapsulating, by the access gateway, the first data packet to a first IPv6-over-IPv4 tunnel packet and sending the first IPv6-over-IPv4 tunnel packet to the CGN device through an IPv6-over-IPv4 tunnel if the first data packet is the first IPv6 packet.

11. The method according to claim 10, wherein the forwarding the IPv4 packet to the CGN device comprises:
replacing, by the access gateway, a second private IPv4 address of the first data packet with a first private IPv4 address; and
forwarding, by the access gateway, the first data packet carrying the first private IPv4 address to the CGN device.

12. The method according to claim 11, further comprising:
recording, by the access gateway, a second mapping relationship after replacing the second private IPv4 address of the first data packet with the first private IPv4 address.

13. The method according to claim 12, wherein the second mapping relationship comprises a corresponding relationship between the second private IPv4 address and the first private IPv4 address.

14. The method according to claim 12, wherein the second mapping relationship comprises a corresponding relationship among the first private IPv4 address, the second private IPv4 address and a second private port number.

15. The method according to claim 12, wherein when receiving a second data packet carrying the first private IPv4 address forwarded by the CGN device, the method further comprises:
translating, by the access gateway, the first private IPv4 address of the second data packet into the second private IPv4 address according to the second mapping relationship; and
forwarding, by the access gateway, the second data packet carrying the second private IPv4 address to the client.

16. The method according to claim 10, wherein when receiving a second data packet forwarded by the CGN device through the IPv6-over-IPv4 tunnel, the method further comprising:
decapsulating, by the access gateway, the second data packet to a second IPv6 packet, and sending the second IPv6 packet to the client.

17. A Carrier Grade Network Address Translation (CGN) device, comprising:
a receiver, configured to receive a first data packet forwarded by an access gateway;
a determining module, configured to determine whether the first data packet is a first Internet Protocol Version 4 (IPv4) packet or a first Internet Protocol Version 6 (IPv6)-over-IPv4 tunnel packet according to information in a header of the first data packet;
a first communication module, configured to forward the first data packet to an IPv4 network if the determining module determines that the first data packet is the first IPv4 packet; and
a second communication module, configured to decapsulate the first data packet to a first IPv6 packet if the determining module determines that the first data packet is the first IPv6-over-IPv4 tunnel packet, and send the first IPv6 packet to an IPv6 network.

18. The CGN device according to claim 17, wherein the first communication module comprises:
an IPv4 address translating module, configured to replace a first private IPv4 address carried in the first data packet with a public IPv4 address; and
a sending module, configured to forward the first data packet carrying the public IPv4 address to the IPv4 network.

19. The CGN device according to claim 18, further comprising:
a third communication module, configured to receive a second data packet from the IPv4 network, replace the public IPv4 address carried in the second data packet with the first private IPv4 address, and forward the second data packet to the access gateway; and
a fourth communication module, configured to encapsulate a second IPv6 packet to a second IPv6-over-IPv4 tunnel packet according to recorded information about an IPv6-over-IPv4 tunnel when receiving the second IPv6 packet from the IPv6 network, and send the second IPv6-over-IPv4 tunnel packet to the access gateway through the IPv6-over-IPv4 tunnel.

20. An access gateway, comprising:
a receiver, configured to receive a first data packet from a client;
a determining unit, configured to determine whether the first data packet received by the receiver is a first Internet Protocol Version 4 (IPv4) packet or a first Internet Protocol Version 6 (IPv6) packet according to an IP number in a header of the first data packet;
a first communication unit, configured to forward the first data packet to a Carrier Grade Network Address Translation (CGN) device if the determining unit determines that the first data packet is the first IPv4 packet; and
a second communication unit, configured to encapsulate the IPv6 packet into a first IPv6-over-IPv4 tunnel packet if the determining unit determines that the first data packet is the first IPv6 packet, and send the first IPv6-over-IPv4 tunnel packet to the CGN device through an IPv6-over-IPv4 tunnel.

21. The access gateway according to claim 20, wherein the first communication unit comprises:
an IPv4 address translating unit, configured to replace a second private IPv4 address of the first data packet with a first private IPv4 address; and
a sending unit, configured to send the first data packet carrying the first private IPv4 address to the CGN device.

22. The access gateway according to claim 21, further comprising:
a third communication unit, configured to replace the first private IPv4 address carried in a second data packet forwarded by the CGN device with the second private IPv4 address, and forward the second data packet to the client; and
a fourth communication unit, configured to decapsulate a second IPv6-over-IPv4 tunnel packet sent by the CGN device through the IPv6-over-IPv4 tunnel to a second IPv6 packet, and send the second IPv6 packet to the client.

* * * * *